United States Patent
Shah et al.

(10) Patent No.: US 11,929,183 B2
(45) Date of Patent: Mar. 12, 2024

(54) THORIUM-BASED FUEL DESIGN FOR PRESSURIZED HEAVY WATER REACTORS

(71) Applicant: CLEAN CORE THORIUM ENERGY LLC, Oak Brook, IL (US)

(72) Inventors: Mehul Shah, Oak Brook, IL (US); Rida Milany, North York (CA); Koroush Shirvan, Boston, MA (US)

(73) Assignee: CLEAN CORE THORIUM ENERGY LLC, Oak Brook, IL (US)

( * ) Notice: Subject to any disclaimer, the term of this patent is extended or adjusted under 35 U.S.C. 154(b) by 0 days.

(21) Appl. No.: 18/195,112

(22) Filed: May 9, 2023

(65) Prior Publication Data
US 2024/0021328 A1  Jan. 18, 2024

Related U.S. Application Data

(60) Division of application No. 17/838,928, filed on Jun. 13, 2022, now Pat. No. 11,705,249, which is a
(Continued)

(51) Int. Cl.
*G21C 3/326* (2006.01)
*G21C 3/04* (2006.01)
(Continued)

(52) U.S. Cl.
CPC .......... *G21C 3/3265* (2019.01); *G21C 3/045* (2019.01); *G21C 3/048* (2019.01); *G21C 3/328* (2013.01); *G21C 3/58* (2013.01); *G21C 1/086* (2013.01)

(58) Field of Classification Search
CPC ...... G21C 3/3265; G21C 3/045; G21C 3/048; G21C 3/58; G21C 3/328
(Continued)

(56) References Cited

U.S. PATENT DOCUMENTS

| 3,960,655 A | 6/1976 | Bohanan et al. |
| 4,393,510 A | 7/1983 | Lang et al. |

(Continued)

FOREIGN PATENT DOCUMENTS

| CA | 2710432 A1 | 7/2009 |
| CA | 2748367 A1 | 7/2010 |

(Continued)

OTHER PUBLICATIONS

US 10,002,681 B2, 06/2018, Bashkirtsev et al. (withdrawn)
(Continued)

*Primary Examiner* — Jack W Keith
*Assistant Examiner* — Daniel Wasil
(74) *Attorney, Agent, or Firm* — Pillsbury Winthrop Shaw Pittman, LLP (57) ABSTRACT

Thorium-based fuel bundles according to one or more embodiments of the present invention are used in existing PHWR reactors (e.g., Indian 220 MWe PHWR, Indian 540 MWe PHWR, Indian 700 MWe PHWR, CANDU 300/600/900) in place of conventional uranium-based fuel bundles, with little or no modifications to the reactor. The fuel composition of such bundles is 60+ wt % thorium, with the balance of fuel provided by low-enriched uranium (LEU), which has been enriched to 13-19.95% 235U. According to various embodiments, the use of such thorium-based fuel bundles provides (1) 100% of the nominal power over the entire life cycle of the core, (2) high burnup, and (3) non-proliferative spent fuel bundles having a total isotopic uranium concentration of less than 12 wt %. Reprocessing of spent fuel bundles is also avoided.

23 Claims, 5 Drawing Sheets

| Pellet/Pin | $^{235}U$ Enrichment | Uranium Concentration (wt % of fuel) | Thorium Concentration (wt % of fuel) | Burnable Poison (wt % of pellet) |
|---|---|---|---|---|
| fuel pellet 1300a, central pin 1200a, and first ring pins 1200b | 19% | 40 | 60 | Europium Oxide 1.2% |
| fuel pellet 1300b and second ring pins 1200c | 17% | 25 | 75 | Europium Oxide 0.1% |
| fuel pellet 1300c and outer ring pins 1200d | 16% | 15 | 85 | - |

Related U.S. Application Data continuation of application No. PCT/US2021/047719, filed on Aug. 26, 2021.

(60) Provisional application No. 63/186,990, filed on May 11, 2021.

(51) Int. Cl.
  *G21C 3/328* (2006.01)
  *G21C 3/58* (2006.01)
  *G21C 1/08* (2006.01)

(58) Field of Classification Search
  USPC .................................................. 376/409, 901
  See application file for complete search history.

(56) References Cited

U.S. PATENT DOCUMENTS

| | | | |
|---|---|---|---|
| 5,075,075 A * | 12/1991 | Kapil | G21C 3/18 |
| | | | 376/419 |
| 5,136,619 A | 8/1992 | Capossela et al. | |
| 5,737,375 A | 4/1998 | Radkowsky | |
| 7,844,025 B2 | 11/2010 | Bouffier | |
| 8,116,423 B2 | 2/2012 | Bashkirtsev et al. | |
| 8,268,204 B2 | 9/2012 | Rhee et al. | |
| 8,449,795 B2 | 5/2013 | Yang et al. | |
| 8,557,148 B2 | 10/2013 | Rhee et al. | |
| 8,585,939 B2 | 11/2013 | Rhee et al. | |
| 8,632,705 B2 | 1/2014 | Jankowiak et al. | |
| 8,654,917 B2 | 2/2014 | Bashkirtsev et al. | |
| 9,042,507 B2 | 5/2015 | Doerr et al. | |
| 9,190,179 B2 | 11/2015 | Yang et al. | |
| 9,330,795 B2 | 5/2016 | Picart et al. | |
| 9,355,747 B2 | 5/2016 | Bashkirtsev et al. | |
| 9,799,414 B2 | 10/2017 | Boubcher et al. | |
| 9,847,145 B2 | 12/2017 | Na et al. | |
| 9,941,025 B2 | 4/2018 | Ahlfeld et al. | |
| 9,966,156 B2 | 5/2018 | Vaudez | |
| 10,026,510 B2 | 7/2018 | Blanchard et al. | |
| 10,037,823 B2 | 7/2018 | Bashkirtsev et al. | |
| 10,170,207 B2 | 1/2019 | Bashkirtsev et al. | |
| 10,176,898 B2 | 1/2019 | Boubcher et al. | |
| 10,347,383 B2 | 7/2019 | Martinez et al. | |
| 10,361,007 B2 | 7/2019 | Widegren | |
| 10,361,008 B2 | 7/2019 | Widegren et al. | |
| 10,381,119 B2 | 8/2019 | Kurina et al. | |
| 10,720,245 B1 | 7/2020 | Vaghetto et al. | |
| 10,726,958 B2 | 7/2020 | Insulander Bjork et al. | |
| 10,748,670 B1 | 8/2020 | Frost et al. | |
| 10,755,830 B1 | 8/2020 | Frost et al. | |
| 10,777,327 B1 | 9/2020 | Vaghetto et al. | |
| 10,784,009 B1 | 9/2020 | Frost et al. | |
| 10,803,998 B1 | 10/2020 | Vaghetto et al. | |
| 10,839,971 B1 | 11/2020 | Frost et al. | |
| 10,854,342 B2 | 12/2020 | Shilov | |
| 10,950,356 B2 | 3/2021 | Kuran et al. | |
| 10,991,473 B2 | 4/2021 | Bashkirtsev et al. | |
| 11,037,688 B2 | 6/2021 | Kuran et al. | |
| 11,056,246 B2 | 7/2021 | Bromley | |
| 11,056,248 B2 | 7/2021 | Bromley | |
| 2005/0069075 A1 | 3/2005 | D'Auvergne | |
| 2007/0242791 A1 | 10/2007 | Dubois et al. | |
| 2016/0035441 A1 | 2/2016 | Totemeier et al. | |
| 2016/0284428 A1 | 9/2016 | Bjork et al. | |
| 2018/0040385 A1 | 2/2018 | Hong et al. | |
| 2018/0240557 A1 | 8/2018 | Boucher et al. | |
| 2019/0139653 A1 | 5/2019 | Bashkirtsev et al. | |
| 2020/0027576 A1 | 1/2020 | Totemeier et al. | |
| 2020/0365290 A1 | 11/2020 | Fisher et al. | |
| 2021/0020324 A1 | 1/2021 | Shao et al. | |
| 2021/0050121 A1 | 2/2021 | Na et al. | |
| 2021/0202115 A1 | 7/2021 | Na et al. | |

FOREIGN PATENT DOCUMENTS

| | | |
|---|---|---|
| CA | 2946210 A1 | 7/2010 |
| CA | 2798539 A1 | 11/2011 |
| CA | 2985909 A1 | 11/2011 |
| CA | 2810133 A1 | 3/2012 |
| CA | 2817767 A1 | 5/2012 |
| CA | 2817884 A1 | 5/2012 |
| CA | 2820125 A1 | 5/2012 |
| CA | 2839084 A1 | 7/2014 |
| CA | 2927139 A1 | 6/2015 |
| CA | 2960383 A1 | 3/2016 |
| CA | 2976046 A1 | 8/2016 |
| CA | 3026544 A1 | 11/2018 |
| CN | 107068209 A | 8/2017 |
| CN | 112358308 A | 2/2021 |
| FR | 2998288 A1 | 5/2014 |
| KR | 102089039 A | 7/2019 |
| WO | 2014182544 A1 | 11/2014 |
| WO | 2019243095 A1 | 12/2019 |

OTHER PUBLICATIONS

Banerjee, "Nuclear power from thorium: Different options", Current Science (2016): 1607-1623). (Year: 2016).*

Björk et al. "Comparison of thorium-based fuels with different fissile components in existing boiling water reactors." Progress in Nuclear Energy 53, No. 6 (2011): 618-625.

Mendoza España et al. "A Canadian Perspective of the Economic Issues Associated with Deploying Thorium-Based Fuel Cycles and Breeding in Heavy-Water Reactors." CNL Nuclear Review 8, No. 2 (2019): 109-130.

Mendoza España et al. "Resource demand and economic impact of various thorium-based fuels for potential near-term use in a pressure-tube heavy water reactor." Nuclear Technology 203, No. 3 (2018): 232-243.

"How the US is aiming to fabricate a proprietary thorium-based nuclear fuel", Nuclear Engineering International, Feb. 22, 2021, 3 pages.

"Thorium fuel utilization: Options and trends", Proceedings of three IAEA meetings held in Vienna in 1997, 1998 and 1999, International Atomic Energy Agency, Nov. 2002.

"Aneel and its appeal", Mar. 24, 2021, 2 pages—https://www.neimagazine.com/features/featureaneel-and-its-appeal-8621195/.

Krishnani, P.D.: "Studies of advanced fuel cycles in Indian PHWRs and AHWR", International Conference on Advances in Nuclear Science and Engineering in Conjunction with LKSTN, 2007, pp. 239-244.

Hirano, Y. et al.: "Optimization of Fuel Rod Enrichment Distribution to Minimize Rod Power Peaking throughout Life within BWR Fuel Assembly", Journal of Nuclear Science and Technology, vol. 34, No. 1, Jan. 1997, pp. 5-12.

Floyd, M. et al.: "A Canadian Perspective on Progress in Thoria Fuel Science and Technology", CNL Nuclear Review, vol. 6, No. 1, Jun. 2017, 17 pages.

Bell, J.S et al.: "A Thoria and Thorium Uranium Dioxide Nuclear Fuel Performance Model Prototype and Knowledge Gap Assessment", Journal of Nuclear Engineering and Radiation Science, vol. 5, Jan. 2019, 12 pages.

Sehgal, "Feasibility and Desirability of Employing the Thorium Fuel Cycle for Power Generation", Thorium Energy for the World, Proceedings of the ThEC13 Conference, CERN, Globe of Science and Innovation, Geneva, Switzerland, Oct. 2013. (Year: 2013).

Ade, "Safety and Regulatory Issues of the Thorium Fuel Cycle", NU REG/CR-7176, ORN L/TM/2013/543, Feb. 2014. (Year: 2014).

Bezdedeanu-Neacsa, "Reducing Void Effect in Thorium-Based Advanced Candu Reactors by Using Burnable Absorbers", Nuclear 2018. (Year: 2018).

Non-Final Office Action issued in related U.S. Appl. No. 17/838,928, dated Feb. 3, 2023.

(56) References Cited

OTHER PUBLICATIONS

Notice of Allowance issued in related U.S. Appl. No. 17/838,928, dated May 1, 2023.

* cited by examiner

Figure 1: Full Core Configuration in Indian 220 MWe PHWR

Figure 2: Basic geometry of Fuel Bundles 100

Figure 3A　　　　　Figure 3B　　　　　Figure 3C

| Isotope | Fuel Bundles 100a, 100b / Fuel Pins 200a, 200b / Fuel Pellets 300a | Fuel Bundle 100a / Fuel Pins 200b / Fuel Pellet 300a' | Fuel Bundle 100a, 100b / Outer Fuel Pin 200c / Fuel Pellet 300b | Thorium Fuel Bundle 100c / Thorium Fuel Pin 200d / Thorium Fuel Pellet 300c |
|---|---|---|---|---|
| Thorium (wt%) | 70.0 wt % | ~70.0 wt % | 85.0 | 100 |
| Uranium | 30 wt%; 13.0% $^{235}$U enriched | ~30 wt%; 13.0% $^{235}$U enriched | 15 wt%; 15.0% $^{235}$U enriched | 0 |
| Poison (e.g., boron oxide) | 0 | 0.22 wt% | 0 | 0 |

Figure 4: Fuel Composition in the Fuel Bundle 100

| Rings/Pin | $^{235}$U Enrichment | Thorium/Uranium Concentration (wt %) | Burnable Poison |
|---|---|---|---|
| Outer Fuel Pin 200c / Fuel Pellet 300b | 17.8% | 85/15 | Erbium Oxide 1.3% |
| Middle Fuel Pins 200b / Fuel Pellet 300a | 17.8% | 75/25 | - |
| Inner Fuel Pins 200a / Fuel Pellets 300a | 17.8% | 70/30 | - |

Figure 5: Fuel Composition in the Fuel Bundle 100a, 100b

Figure 6

| Pellet/Pin | $^{235}U$ Enrichment | Uranium Concentration (wt % of fuel) | Thorium Concentration (wt % of fuel) | Burnable Poison (wt % of pellet) |
|---|---|---|---|---|
| fuel pellet 1300a, central pin 1200a, and first ring pins 1200b | 19% | 40 | 60 | Europium Oxide 1.2% |
| fuel pellet 1300b and second ring pins 1200c | 17% | 25 | 75 | Europium Oxide 0.1% |
| fuel pellet 1300c and outer ring pins 1200d | 16% | 15 | 85 | - |

Figure 7

THORIUM-BASED FUEL DESIGN FOR PRESSURIZED HEAVY WATER REACTORS

CROSS REFERENCE

This application is a divisional application of U.S. application Ser. No. 17/838,928, filed Jun. 13, 2022, and claims priority to PCT Application No. PCT/US21/47719, filed Aug. 26, 2021, and U.S. Provisional Application No. 63/186,990, filed May 11, 2021, all of which are titled "Thorium-Based Fuel Design For Pressurized Heavy Water Reactors," the entire contents of each of which are hereby incorporated by reference herein.

BACKGROUND

1. Field of the Invention

Various embodiments relate generally to fuel pellets, pins, bundles, and core loading for a pressurized heavy water nuclear reactor ("PHWR"), and specifically relate to a thorium-based fuel composition for such pellets, pins, bundles, and cores.

2. Description of Related Art

Figure 1:
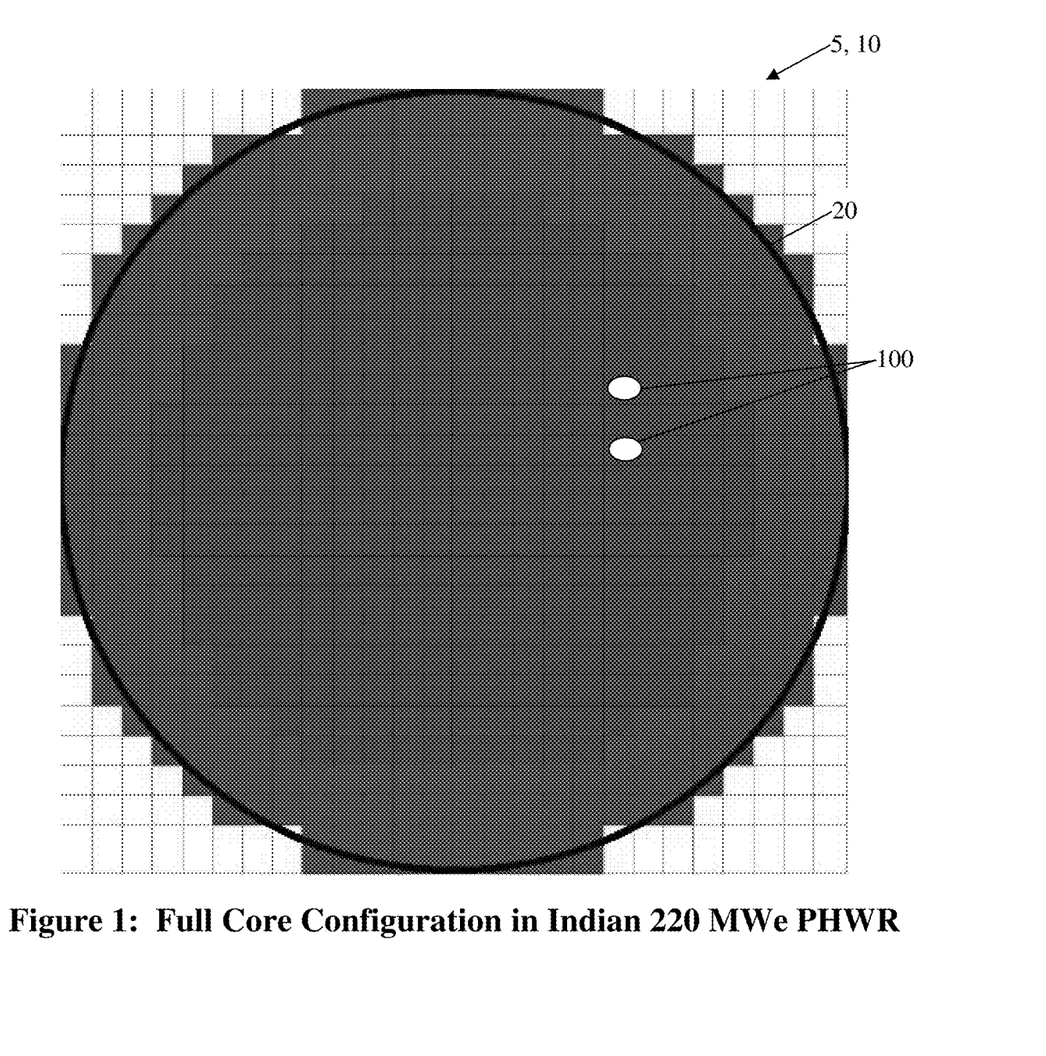
FIG. 1 is a diagrammatic end view of a PHWR reactor according to one or more embodiments.

The 220 MWe PHWR is a heavy water moderated and heavy water cooled reactor with a reactor vessel 10. The reactor comprises 306 fuel channels in the form of horizontal pressure tubes with coolant flow at high pressure. Each channel contains 12 fuel bundles but only 10 are located in the active core. To isolate the hot fuel channels from the colder moderator, the pressure tubes are loaded in calandria tubes that are surrounded by heavy water moderator. The pressure tubes are arranged in square lattice with a lattice pitch of 22.84 cm. The geometry of the reactor core 20 including the heavy water moderator reflector and exemplary fuel bundles are shown in FIG. 1. In FIG. 1, only two exemplary bundles are shown, but it should be understood that additional fuel bundles (not shown in FIG. 1) are provided in each of the 306 channels.

The fuel bundle is a cluster of fuel pins with 19 pins per bundle. The overall length of the fuel bundle is 49.53 cm. The fuel is in the form of uranium dioxide pellets clad in zircaloy-4 pins. The fuel stack length is 48.1 cm and the fuel pins are sealed by end-caps welded to the ends of the fuel pin. To maintain the structural integrity of the fuel bundles, two end-plates are welded to the end-caps of the fuel pins.

In addition to the fuel channels, the reactor core comprises a number of reactivity control devices. All reactivity devices are perpendicular to the fuel channels and penetrate the reactor pressure vessel from top to bottom. Reactor power regulation is provided by the means of two power regulating rods that are normally 80% inserted. For the control of the power shape and for xenon override, 4 adjuster rods are installed which are normally fully inserted. Reactor shutdown is provided by the means of the primary shutdown system which comprises 14 shutdown rods normally parked out-of-core. In case of emergencies and failure of the primary shutdown system, the shutdown functionality can be provided independently by the secondary shutdown system that comprises 12 liquid poison compartments. The liquid compartments are normally filled by helium gas, and when required, liquid neutron poisons are injected in short time to provide safe reactor shutdown. In addition, the reactor has two shim rods which are used to support shim mode operation when required; these are normally parked out-of-core.

Canadian Patent Application Publication No. 2 810 133 discloses a nuclear fuel bundle containing thorium and a nuclear reactor comprising the same. See also U.S. Patent Application Publication No. 2016/0035441.

SUMMARY

One or more non-limiting embodiments provide thorium-based fuel (e.g., fuel pellet(s), fuel pin(s), and/or fuel bundle(s)) for a PHWR reactor, and a method of making and using the same, as disclosed and claimed herein.

One or more non-limiting embodiments provide a fresh fuel pellet configured to be used in a pressurized heavy water reactor. The fuel pellet includes thorium and uranium fuel. A fuel composition of the fuel pellet is between 55 and 90 wt % thorium, and between 10 and 45 wt % uranium. A $^{235}$U enrichment of the uranium is between 10.5% and 20%.

According to one or more of these embodiments, the pellet is annular in shape with a through-hole.

According to one or more of these embodiments, the through-hole has a diameter of between 0.3 and 1.0 cm.

According to one or more of these embodiments, the fuel composition is between 70 and 90 wt % thorium.

According to one or more of these embodiments, the $^{235}$U enrichment of the uranium is between 15% and 19%.

One or more non-limiting embodiments provides a fuel pin configured to be used in a pressurized heavy water reactor. The fuel pin includes a sealed tube, and a plurality of fuel pellets according to one or more of the embodiments disclosed herein. The plurality of fuel pellets are disposed inside the sealed tube.

According to one or more of these embodiments, a fuel composition of the fuel pin is between 70 and 85 wt % thorium.

According to one or more of these embodiments, each of the plurality of fuel pellets includes burnable poison.

One or more non-limiting embodiments provides a fuel bundle configured to be used in a pressurized heavy water reactor. The fuel bundle includes a plurality of fuel pins according to one of the embodiments disclosed herein. A fuel composition of at least one of the plurality of fuel pins differs from a fuel composition in at least one other of the plurality of fuel pins.

According to one or more of these embodiments, the fuel bundle is shaped and configured to be used in a 220 MWe PHWR; the plurality of fuel pins has exactly 19 fuel pins including one central fuel pin, six intermediate fuel pins disposed radially outwardly from the one central fuel pin, and twelve outer fuel pins disposed radially outwardly from the six intermediate fuel pins. A thorium weight percentage of the fuel composition of the central fuel pin is lower than a thorium weight percentage of the fuel composition of each of the twelve outer fuel pins.

According to one or more of these embodiments, the fuel composition of each of the central fuel pin and six intermediate fuel pins has a thorium content of between 55 and 75 wt %; the fuel composition of each of the twelve outer fuel pins has a thorium content of between 65 and 90 wt %; and each of the twelve outer fuel pins has a higher wt % thorium content than each of the central and six intermediate fuel pins.

According to one or more of these embodiments, the fuel composition of the central fuel pin has a lower wt % thorium content than in each of the six intermediate fuel pins; and the fuel composition of each of the six intermediate fuel pins has a lower wt % thorium content than in each of the twelve outer fuel pins.

According to one or more of these embodiments, the fuel composition of the central fuel pin has a thorium content of between 55 and 70 wt %; the fuel composition of each of the six intermediate fuel pins has a thorium content of between 60 and 80 wt %; and the fuel composition of each of the twelve outer fuel pins has a thorium content of between 65 and 90 wt %.

According to one or more of these embodiments, the fuel bundle further includes burnable poison disposed in the sealed tube of each of the six intermediate fuel pins.

According to one or more of these embodiments, burnable poison is not disposed in the sealed tube of any of the outer fuel pins.

According to one or more of these embodiments, the fuel bundle further includes burnable poison disposed in the sealed tube of each of the central and six intermediate fuel pins, wherein burnable poison is not disposed in the sealed tube of any of the outer fuel pins.

According to one or more of these embodiments, the burnable poison disposed in the sealed tube of each of the central and six intermediate fuel pins includes Europium.

According to one or more of these embodiments, the fuel bundle includes burnable poison disposed in the sealed tube of each of the twelve outer fuel pins.

According to one or more of these embodiments, burnable poison is not disposed in the sealed tube of the central fuel pin or any of the intermediate fuel pins.

According to one or more of these embodiments, burnable poison is not disposed in the sealed tube of any of the fuel pins of the fuel bundle.

According to one or more of these embodiments, a $^{235}$U enrichment of the uranium of each of the central, intermediate, and outer pins is at least 12%.

According to one or more of these embodiments, a $^{235}$U enrichment of the uranium of each of pellets of each of the central, intermediate, and outer pins is at least 15%.

According to one or more of these embodiments, a $^{235}$U enrichment of the uranium of each of the pellets of each of the twelve outer pins is lower than a $^{235}$U enrichment of the uranium of each of the pellets of each of the central and six intermediate pins.

According to one or more of these embodiments the fuel bundle is shaped and configured to be used in a CANDU PHWR; and the plurality of fuel pins include exactly 37 fuel pins including one central fuel pin, six first ring fuel pins disposed radially outwardly from the one central fuel pin, twelve second ring fuel pins disposed radially outwardly from the six first ring fuel pins, and eighteen outer fuel ring pins disposed radially outwardly from the twelve second ring fuel pins.

According to one or more of these embodiments, a thorium weight percentage of the fuel composition of the central fuel pin is lower than a thorium weight percentage of the fuel composition of the second ring pins and of the outer ring pins.

According to one or more of these embodiments: a thorium weight percentage of the fuel composition of the central fuel pin and of the first ring fuel pins is between 50 and 70 wt %; a thorium weight percentage of the fuel composition of the second ring fuel pins is between 60 and wt %; and a thorium weight percentage of the fuel composition of the outer ring fuel pins is between 75 and 99 wt %.

According to one or more of these embodiments, a $^{235}$U enrichment of the uranium of the central fuel pin and first ring fuel pins is higher than a $^{235}$U enrichment of the uranium of the second ring pins or outer ring pins.

According to one or more of these embodiments, a $^{235}$U enrichment of the uranium of the second ring fuel pins is higher than a $^{235}$U enrichment of the uranium of the outer ring pins.

According to one or more of these embodiments, the central pin, first ring pins, and second ring pins each include burnable poison.

According to one or more of these embodiments, the burnable poison includes Europium Oxide.

According to one or more of these embodiments, the outer ring pins do not include burnable poison.

One or more embodiments provides a pressurized heavy water reactor including a reactor vessel, and a core disposed in the reactor vessel. The core includes a plurality of fuel bundles according to one or more of the embodiments disclosed herein. The plurality of fuel bundles include a first type of fuel bundle and a second type of fuel bundle. The first type of fuel bundle includes burnable poison. The second type of fuel bundle does not include burnable poison.

According to one or more of these embodiments, the first and second types of fuel bundles are identical to each other except for the inclusion of burnable poison in the second type of fuel bundle.

One or more embodiments provides a fuel pellet configured to be used in a pressurized heavy water reactor. The fuel pellet includes thorium and uranium fuel. A fuel composition of the fuel pellet is between 55 and 90 wt % thorium, and between 10 and 45 wt % uranium. A 235 U enrichment of the uranium is between 5% and 20%. The pellet is annular in shape with a through-hole.

According to one or more of these embodiments after removing the bundle, pins, and/or pellets from the reactor, a total isotopic uranium concentration within the spent fuel pellets, pins, and/or bundles (as a weight percentage of the spent fuel pellet(s), pin(s), and bundle), is less than 12, 11, 10, 9, 8, and/or 7%.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc. Similarly, where multiple parameters (e.g., parameter C, parameter D) are separately disclosed as having ranges, the embodiments disclosed herein explicitly include embodiments that combine any value within the disclosed range of one parameter (e.g., parameter C) with any value within the disclosed range of any other parameter (e.g., parameter D).

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

The 220 MWe PHWR is a standarised PHWR design developed and operated in India. This well known type of reactor will hereinafter be referred to as an "220 MWe PHWR," even if the reactor is not physically located in India.

The Indian 220 MWe PHWR uses natural uranium (i.e., non-enriched uranium) in a low burnup open fuel cycle. Due to the use of natural uranium and the potential of exploitation for plutonium production as well as the concerns with nuclear waste produced, the current design is not favoured for export and its utilisation is limited to domestic electricity production. With the 220 MWe PHWR, spent fuel has a low burnup. Various non-limiting embodiments of the present invention provide an alternative fuel cycle for use in the 220 MWe PHWR to address the proliferation and nuclear waste concerns. Various non-limiting embodiments of the present invention are based on the adaptation of the 220 MWe design for a high burnup once-through fuel cycle based on thorium, providing a 220 MWe ThPHWR 5 with a reactor 10 housing a core 200 that comprises thorium-LEU fuel bundles 100.

Figure 2:
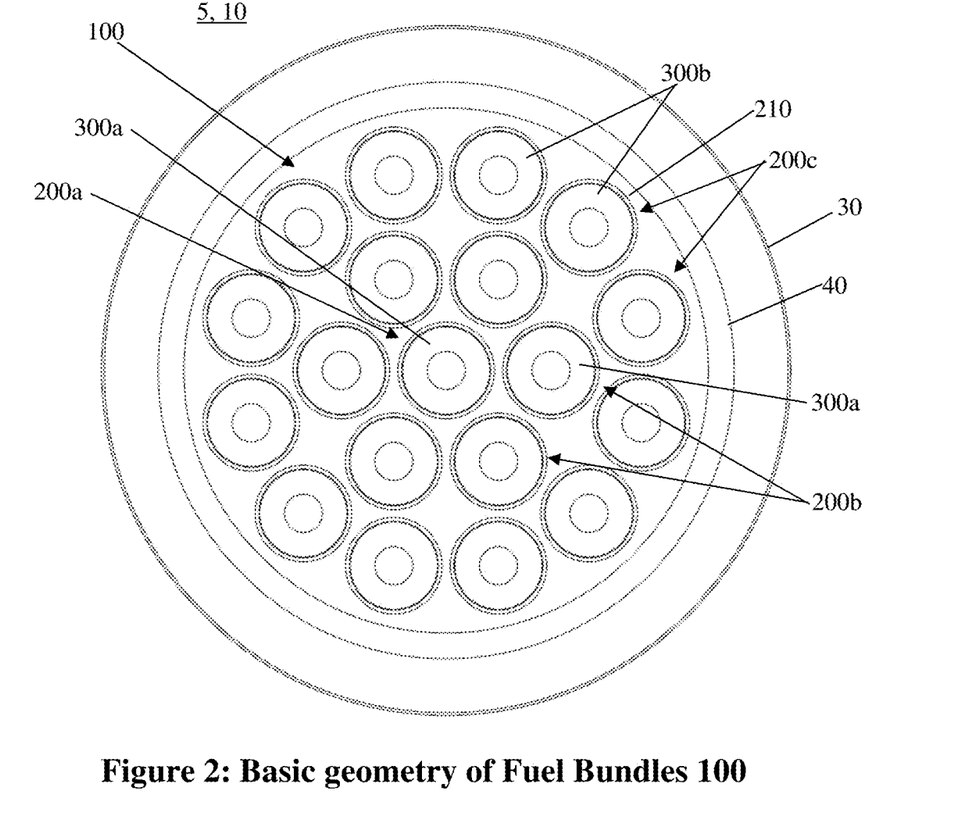
FIG. 2 is a diagrammatic end view of a fuel bundle and a portion of the reactor of FIG. 1.

As shown in FIG. 2, the reactor 10 includes a plurality of calandria tubes 30 and pressure tubes 40 that define the channels into which the fuel bundles 100 are placed. The calandria tubes 30 and pressure tubes 40 are well-known components of a conventional 220 Mwe PHWR to which one or more embodiments are directed, so an exhaustive description of these conventional components of a 220 Mwe PHWR are omitted.

According to various embodiments, a thorium based fuel cycle reduces or eliminates any proliferation risks given that fissile plutonium breeding is insignificant and uranium-233, because of associated uranium-232 contamination, is not practical for use in nuclear weapons. On the other hand, a high burnup fuel cycle is favoured as the amount of radioactive waste generated is significantly reduced. According to various non-limiting embodiments, a thorium-LEU fuel in PHWR may provide the best proliferation resistance among all water reactor types.

According to various non-limiting embodiments of the present invention, the overall systems and plant design of the 220 Mwe PHWR (see FIG. 1) are retained from the current 220 Mwe PHWR to form the 220 Mwe ThPHWR 5, 10. According to various non-limiting embodiments of the present invention, the fuel bundle 100 delivers a high burnup thorium fuel cycle.

According to various non-limiting embodiments of the present invention, the impacts of the design changes (converting a 220 Mwe PHWR into a 220 Mwe ThPHWR 5, 10) are limited to the core 20 characteristics rather than the overall plant 5, which reduces the effort required to implement and license the modified design.

According to various non-limiting embodiments of the present invention, the impacts of the design modification may include one or more of the following:
  i) The reactor physics characteristics of the core 20 of the 220 Mwe ThPHWR 5, 10 are completely different due to the changes in the fuel composition and the unique neutronic characteristics of thorium fuels.
  ii) The adaptation of the high burnup cycle may pose challenges on the structural integrity of the fuel bundles 100 given that the structure of the current/conventional fuel bundles is used in a low burnup fuel cycle.

According to various non-limiting embodiments of the present invention, a thorium fuel cycle is based on the following restrictions:
  i) Any design changes to the fuel bundle are limited to the internal dimensions of the fuel pins with the overall geometry and structure of the fuel bundle retained from the current/conventional design. With this restriction, the majority of the safety and design analysis of the reactor core will be applicable to various non-limiting embodiments of the present invention.
  ii) In optimising the design of the fuel bundle and reactor core, the current power limits imposed on the operating 220 Mwe PHWR are to be respected for the 220 Mwe ThPHWR 10. This restriction implies that the current design of the heat transfer system and the thermal-hydraulics apply to various non-limiting embodiments of the present invention, without a need for any modifications.

According to various non-limiting embodiments of the present invention, a thorium fueled once-through high burnup nuclear reactor cycle is provided.

One or more non-limiting embodiments retains, to the extent possible, all design features of the 220 Mwe PHWR. Such an approach may lead to minimising the effort required to establish the safety case of the reactor and allows implementation of one or more non-limiting embodiments in the near future. On the reactor core side, the geometry of the core, the number of fuel channels and the size of the core are not changed. On the fuel bundle side, the external dimensions of fuel pins and the shape of the fuel bundle are not changed. That is, one or more non-limiting embodiments provide a fuel bundle 100 that contains 19 fuel pins with overall length of 49.53 cm. The changes in the fuel bundle 100 design according to various non-limiting embodiments may be limited to:

i) The fuel composition; and/or ii) The internal design and structure of the fuel pin 200.

As explained in greater detail below, a ThPHWR 5 includes a reactor and reactor vessel (shown as a circle in FIG. 1) that houses a reactor core 20 that comprises fuel bundles 100. The fuel bundles 100 comprise fuel pins 200. The fuel pins 200 comprise sealed tubes 210 that are filled with fuel pellets 300.

The fuel composition of each pellet 300 according to one or more embodiments is a thorium-uranium mixed oxide with low enrichment uranium (LEU). In the initial design studies, the fuel composition was specified to 80% by weight thorium with 20% uranium enrichment.

As used herein, the terms "thorium" and "thorium oxide" are used interchangeably, and both refer to thorium oxide ($ThO_2$). Similarly, as used herein, the terms "uranium" and "uranium oxide" are used interchangeably, and both refer to uranium oxide ($UO_2$).

Figure 3A:
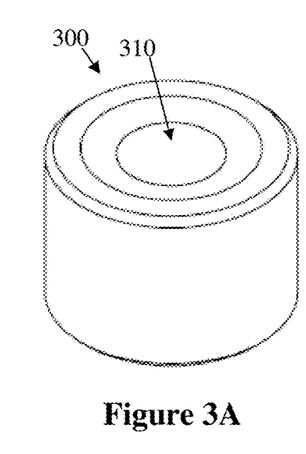
FIG. 3A is a perspective view of a fuel pellet of the fuel bundle illustrated in FIG. 2.
Figure 3B:
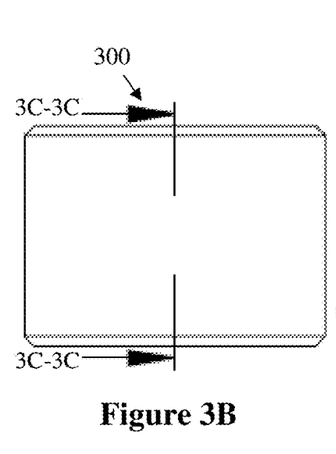
FIG. 3B is a side view of the fuel pellet in FIG. 3A.
Figure 3C:
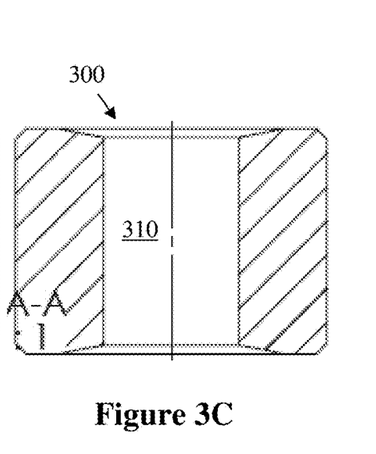
FIG. 3C is a cross-sectional view of the fuel pellet of FIG. 3A, taken along the line 3C-3C in FIG. 3B.

Fuel performance analyses show that large fission gas release and fuel pin internal pressure are expected under high burnup conditions if the current design was to be used. In addition, excessive cladding damage was predicted. To address these two issues, the fuel bundle 100 design was modified as follows:

i) To accommodate the fission gases and reduce the internal pin 200 pressure, a central hole 310 was introduced into the fuel pellets 300 (see FIGS. 2, 3).

ii) To reduce cladding-pellet interactions, the size of the initial fuel-cladding gap was increased.

iii) To reduce the impacts of irradiation damage on the fuel pin integrity, the thickness of the cladding was increased.

iv) Finally, advanced cladding material (e.g., zirconium, Zirlo™) with proven performance at high burnups was selected.

Fuel Pellets 300

As shown in FIG. 3, each fuel pellet 300 has an annular shape that is generally cylindrical with a central axially-extending through-hole 310. According to various non-limiting embodiments, the fuel pellets 300 have the following physical parameters:

i) Fuel pellet 300 outer diameter: at least 0.9, 1.0, 1.1, 1.2, and/or 1.3 cm, less than or equal to than 2.0, 1.9, 1.8, 1.7, 1.6, 1.5, 1.4, 1.3, 1.2, 1.1, and/or 1.0 cm, between any two such values (e.g., between 0.9 and 2.0 cm, between 1.1 and 1.7 cm, between 1.2 and 1.4 cm, between 1.3 and 1.4 cm, about 1.376 cm);

ii) Fuel pellet center hole diameter: at least 0.1, 0.2, 0.3, 0.4, 0.5, 0.6, 0.7, 0.8, and/or 0.9 cm, less than or equal to 1.1, 1.0, 0.9, 0.8, 0.7, 0.6, 0.5, 0.4, and/or 0.3 cm, and/or between any two such values (e.g., between 0.1 and 1.1 cm, between 0.2 and 1.0 cm, between 0.4 and 0.8 cm, between 0.5 and 0.7 cm, about 0.6 cm);

iii) Fuel pellet axial length: at least 0.6, 0.7, 0.8, 0.9, 1.0, 1.1, 1.2, 1.3, 1.4, and/or 1.5 cm, less than or equal to 2.0, 1.9, 1.8, 1.7, 1.6, 1.5, 1.4, 1.3, 1.2, 1.1, 1.0, 0.9, 0.8, and/or cm, and/or between any two such values (e.g., between 0.6 and 2.0 cm, between and 1.2 cm, between 0.9 and 1.1 cm, about 1.0 cm);

iv) Fuel pellet 300 true density 97%;

v) Fuel pellet surface roughness Similar to commercial PHWR fuel—0.76 μm; and vi) Fuel pellet grain size 10-60 μm.

As shown in FIG. 3, the intersection between the hole and the axial ends of the pellet 300 is chamfered, which may reduce pellet chipping during loading and handling, and may reduce strains on the pellet and/or tubing when the pellet swells as a result of irradiation.

According to various embodiments, the fuel composition (on a weight percentage basis) of each pellet 300 (and, by extension, each fuel pin 200 made up of such pellets 300) comprises:

i) at least 50, 55, 60, 65, 70, 75, 80, 85, and/or 90 wt % thorium (e.g., thorium oxide), less than or equal to 100, 95, 90, 85, 80, 75, 70, 65, 60, and/or 55% thorium, and/or between any two such values (e.g., between 50 and 95 wt % thorium, between 60 and wt % thorium, between 65 and 85 wt % thorium);

ii) at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and/or 50 wt % uranium oxide LEU, less than or equal to 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 19, 18, 17, 16, 15, 14, 13, 12, 11, 10, 9, 8, 7, 6, and/or 5 wt % uranium oxide LEU, and/or between any two such values (e.g., between 5 and 50 wt % uranium oxide LEU, between 10 and 40 wt % uranium oxide LEU, between 10 and 30 wt % uranium oxide LEU, about 30 wt % uranium oxide LEU, about 15 wt % uranium oxide LEU); and iii) optionally burnable poison such as boron oxide at a concentration of at least 0.0, 0.05, 0.15, 0.2, and/or 0.3 wt % (as a % of the overall pellet weight) burnable poison (e.g., boron oxide), less than 1.0, 0.9, 0.8, 0.7, 0.6, 0.5, 0.4, 0.3, and/or 0.2 pellet wt %, and/or between any two such values (e.g., between 0.0 and 1.0 pellet wt %, between 0.5 and 0.3 pellet wt %, between 0.1 and 0.3 pellet wt %, between 0.15 and pellet wt %, between 0.2 and 0.3 pellet wt %, about 0.22 pellet wt %). If burnable poison other than boron oxide is used, an equivalent amount/concentration of such other material may be used. As explained below, such burnable poison may be included in certain fuel pellets 300a' that are used in certain fuel pins (e.g., the below-discussed middle ring fuel pins 200b).

Unless otherwise specifically stated, all composition percentages provided herein are weight percentages (wt %).

As explained in further detail below, some fuel pellets 300 omit uranium entirely, such that the fuel composition of the resulting pellet 300c is 100% thorium. As explained below the pellets 300c are used in thorium fuel pins 200d that are used in thorium bundles 100c.

Figure 4:
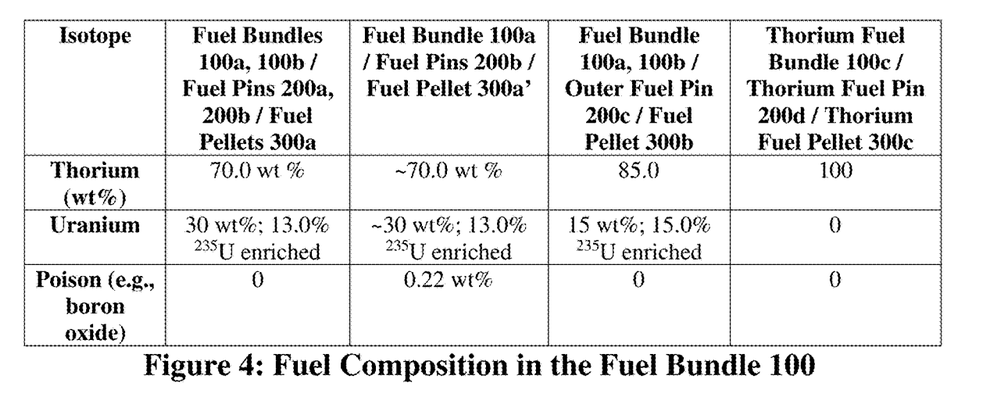
FIG. 4 is a table showing the composition of the pellets, pins, and fuel bundles in FIGS. 2-3, according to one or more non-limiting embodiments.

According to various embodiments, fuel pellets 300 of differing fuel composition may be used within a single pin 200 or different pins 200a, 200b, 200c, 200d. For example, as shown in FIG. 4, according to one or more embodiments:

i) the fuel composition of fuel pellets 300a used in the central fuel pins 200a comprises 70% thorium and 30% uranium, ii) the fuel composition of fuel pellets 300a' used in intermediate ring fuel pins 200b comprises about 70% thorium, about 30% uranium, and 0.22 wt % boron oxide (or other burnable poison), iii) the fuel composition of fuel pellets 300b used in certain outer fuel pins 200c comprises 85% thorium and 15% uranium, and iv) the fuel composition of fuel pellets 300c used in certain other fuel pins 200d and bundles 300c comprises 100% thorium.

According to various embodiments, the LEU of the fuel pellets 300 has a $^{235}U$ enrichment of at least 5, 6, 7, 8, 9, 10, 11, 12, 13, 14, 15, and/or 16%, a $^{235}U$ enrichment of less than or equal to 20, 19, 18, 17, 16, 15, 14, 13, 12, 11, 10, 9, 8, 7, and/or 6%, and or any value between any two such values (e.g., a $^{235}$U enrichment of between 5 and 20%, between 10 and 18%, between 12 and 16%, about 13%, about 15%). According to various embodiments, the $^{235}$U enrichment of the LEU differs between different fuel pellets 300 within a single pin 200. According to various embodiments, as shown in FIG. 4, the $^{235}$U enrichment of the LEU of the fuel pellets 300a, 300a' used in one or more pins 200a, 200b (e.g., 13.0% enrichment) is lower than the enrichment of the LEU of the fuel pellets 300b used in one or more other pins 200c (e.g., 15% enrichment). In the embodiment illustrated in FIG. 4, the difference in enrichment is 2.0 absolute % (13% v. 15%). However, according to alternative embodiments, the absolute difference in enrichment percentage may be higher or lower: e.g.: at least 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 5.5, 6.0, 7.0, 8.0, 9.0, and/or 10.0 absolute % difference, less than 10.0, 9.0, 8.0, 7.0, 6.0, 5.5, 5.0, 4.5, 4.0, 3.5, 3.0, 2.5, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, and/or 0.2 absolute % difference, and or between any two such values (e.g., a difference of between 0.2 and 10.0 absolute %, a difference of 1.0-8.0 absolute %, about 2 absolute %). As used herein, the difference in enrichment means absolute, rather than relative difference in percentage, such that the difference between 5% enriched LEU and 15% enriched LEU is 10% (15% minus 5%), not 200%.

Fuel Pins 200

As shown in FIG. 2, each fuel pin 200 comprises a sealed cladding tube 210. According to various embodiments, the sealed tube 210 comprises an annular tube with end caps attached (e.g., via welding) to each end. Forty to fifty (e.g., 48) axially aligned fuel pellets 300 are disposed within the sealed tube 210, though greater or fewer pellets 300 could be used per pin 200 without deviating from the scope of the present invention. For example, fewer pellets 300 could be used to provide more space for fission gas build up. More pellets 300 could be used, for example if the pellets 300 are axially shortened. According to various embodiments, the tube 210 has a 1.40 cm inner diameter and a 0.06 cm thickness. The tube 210, including its end caps, may comprise any suitable material (e.g., zirconium alloy). According to various embodiments, the interior cavity of the sealed tube 210 is filled pressurized via filler (e.g., helium) to 0.5 Mpa.

As illustrated in FIG. 4, different variations of the pin 200 are filled with different types of fuel pellets 300 as follows:
i) Fuel pins 200a comprise fuel pellets 300a such that the fuel composition of the pins 200a matches that of the pellets 300a (e.g., 70% thorium and 30% uranium (13% enriched));
ii) Fuel pins 200b.

Fuel Bundles 100

As shown in FIG. 2, each fuel bundle 100 comprises a plurality of fuel pins 200. For the 220 Mwe ThPHWR 10 according to one embodiment, the fuel bundle 100 includes 19 fuel pins 200: one central fuel pin 200a, six intermediate fuel pins 200b disposed in a ring radially outwardly from the central fuel pin 200a, and twelve outer fuel pins 200c arranged in a ring radially outwardly from the intermediate ring of pins 200b.

As with conventional fuel bundles, circular end plates with openings for coolant to pass there through are welded or otherwise attached to the axial ends of the fuel pins 200a, 200b, 200c to maintain the pins 200 in the locations shown in FIG. 2.

With these considerations, as shown in FIG. 4, the fuel composition of fuel bundles 100a according to one or more embodiments was determined as follows:
i) The central fuel pin 200a contains fuel having a composition of 70 wt % thorium and 30 wt % uranium (specifically 13% $^{235}$U enrichment uranium). This fuel composition is achieved according to various embodiments by filling the fuel pin 200a with fuel pellets 300a.
ii) The fuel pins 200b in the middle ring are generally similar to the fuel pin 200a, except that the fuel pins 200b are filled with fuel pellets 300a' that also include burnable poison (e.g., pellet wt % boron oxide or other equivalent material and disposition combinations), rather than fuel pellets 300a that omit burnable poison. The fuel pins 200b and fuel pellets 300a' therefore have slightly less thorium and uranium than the fuel pins 200a and fuel pellets 300a because the burnable poison displaces a small amount of thorium and uranium.
iii) The fuel composition of the fuel pins 200c in the outer ring is 85 wt % thorium and 15 wt % uranium (specifically 15% $^{235}$U enrichment uranium). This fuel composition is achieved according to various embodiments by filling the pin 200c with fuel pellets 300b having a matching fuel composition.

The fuel composition of the fuel bundle 100 is summarised in FIG. 4.

According to various alternative embodiments, the fuel composition of any of the fuel pins 200, 200a, 200b may be varied by using fuel pellets 300 having any of the above-discussed fuel compositions (or further alternative fuel compositions) without deviating from the scope of the present invention.

As a result of these various combinations:
i) Th/U fuel bundles 100a comprise:
 (1) a Th/U central fuel pin 200a comprising fuel pellets 300a (70% Th; 30% U (enriched to 13%)) and no burnable poison;
 (2) six Th/U intermediate fuel pins 200b comprising fuel pellets 300a' (fuel composition of 70 wt % Th and 30 wt % U (enriched to 13%); 0.22 pellet wt % boron oxide); and
 (3) twelve outer fuel pins 200c comprising fuel pellets 300b (85 wt % Th; 15 wt % U (enriched 15%)) and no burnable poison;
ii) Th/U fuel bundles 100b may be generally identical to Th/U fuel bundles 100a, except that burnable poison is not included in the pellets 300a' of the six intermediate fuel pins 200b (thus making these intermediate fuel pins 200b substantively identical to the central fuel pins 200a), which results in a fuel bundle 100b that has no burnable poison and comprises:
 (1) a Th/U central fuel pin 200a comprising fuel pellets 300a (70% Th; 30% U (enriched to 13%)) and no burnable poison;
 (2) six Th/U intermediate fuel pins 200b comprising fuel pellets 300a (70 wt % Th; wt % U (enriched to 13%)) and no burnable poison; and
 (3) twelve outer fuel pins 200c comprising fuel pellets 300b (85 wt % Th; 15 wt % U (enriched 15%)) and no burnable poison; and
iii) Th fuel bundles 100c comprise fuel pins 200d that contain Th fuel pellets 300c (100% thorium) and no burnable poison.

Alternative Compositions for Fuel Bundles, Pins, and Pellets

The composition of the fuel bundles 100a, 100b, pins 200a, 200b, 200c, and pellets 300a, 300a', 300b described herein may be modified in a variety of ways according to a variety of alternative embodiments.

According to one or more alternative embodiments of the fuel bundles 100a, 100b, and/or fuel pins 200a, 200b, 200c, the fuel pellets 300a, 300a', 300b may utilize more highly enriched uranium than in one or more of the above described embodiments (e.g., (a) at least 15, 16, 17, and/or 18% $^{235}$U enrichment, (b) less than or equal to 19.95, 19, and/or 18% $^{235}$U enrichment, and/or (c) between any two such upper and lower values (e.g., between 15 and 19.95% 235 U enrichment, between 16 and 19% $^{235}$U enrichment, about 17.8% $^{235}$U enrichment).

According to one or more of these embodiments, the $^{235}$U enrichment level of the uranium in each of the pellets 300a, 300a', 300b may be standardized across many or all of the fuel bundles 100a, 100b, fuel pins 200a, 200b, 200c, and/or fuel pellets 300a, 300a', 300b.

According to one or more of these embodiments, burnable poison may be provided in the outer ring pins 200c and pellets 300b, rather than in the middle ring fuel pins 200b and pellets 300a'. According to various embodiments, the burnable poison used in the outer ring pins 200c and pellets 300b comprises Erbium Oxide at a concentration of (a) at least 0.1, 0.2, 0.3, 0.4, 0.5, 0.7, 0.8, 0.9, 1.0, 1.1, 1.2, and/or 1.3 wt % of the pellet, (b) less than or equal to 3.0, 2.5, 2.4, 2.3, 2.2, 2.1, 2.0, 1.9, 1.8, 1.7, 1.6, 1.5, 1.4, and/or 1.3 wt % of the pellet, and/or (c) between any two such values (e.g., between 0.1 and 3.0 wt % of the pellet, between 1.0 and 2.0 wt % of the pellet, about 1.3 wt % of the pellet).

According to one or more of these embodiments, the thorium concentration of the fuel in the pellets 300a, 300a' of the middle ring pins 200b may be higher than in one or more of the above-discussed embodiments, for example, (a) at least 71, 72, 73, 74, and/or 75 wt % of fuel, (b) less than or equal to 84, 83, 82, 81, 80, 79, 78, 77, 76, and/or 75 wt % of fuel, and/or (c) between any two such values (e.g., between 71 and 84 wt % of fuel, between 72 and 78 wt % of fuel, about 75 wt % of fuel).

Figure 5:
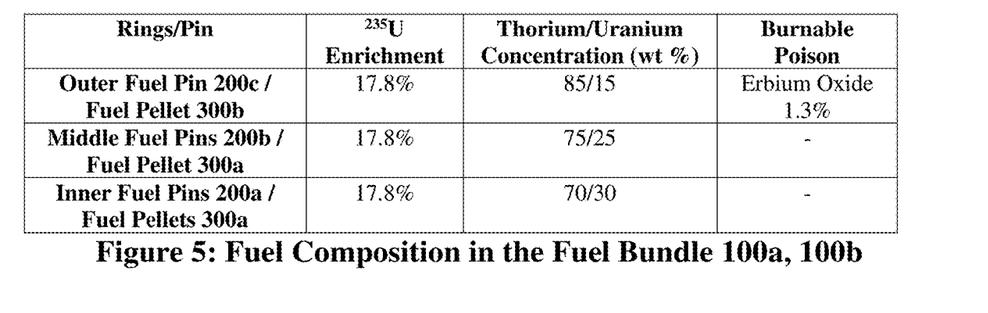
FIG. 5 is a table showing the composition of the pellets, pins, and fuel bundles in FIGS. 2-3, according to one or more non-limiting embodiments.

FIG. 5 illustrates the composition of the fuel bundles 100a, 100b according to one or more of these embodiments.

According to various alternative embodiments, Th/U fuel bundles 100 may comprise:

i) a Th/U central fuel pin 200a comprising:
  (1) fuel pellets 300a with a fuel composition comprising 60% Th and 40% U (enriched to 15%), and
  (2) 0.6 wt % Europium (Eu) burnable poison;
ii) six Th/U intermediate fuel pins 200b comprising:
  (1) fuel pellets 300a' with a fuel composition of 65 wt % Th and 35 wt % U (enriched to 15%), and
  (2) 0.6 wt % Europium (Eu) burnable poison; and
iii) twelve outer fuel pins 200c comprising:
  (1) fuel pellets 300b with a fuel composition comprising 70 wt % Th and 30 wt % U (enriched 10%), and
  (2) no burnable poison.

According to various non-limiting embodiments, the same type of fuel bundles (e.g., as described immediately above) may be used at all locations within the reactor in place of the above-discussed bundles 100a, 100b, and 100c, which had divergent compositions. According to various alternative embodiments, Th/U fuel bundles 100 may comprise:

i) a Th/U central fuel pin 200a comprising:
  (1) fuel pellets 300a with a fuel composition comprising 60% Th and 40% U (enriched to 16%), and
  (2) 0.6 wt % Europium (Eu) burnable poison;
ii) six Th/U intermediate fuel pins 200b comprising:
  (1) fuel pellets 300a' with a fuel composition of 65 wt % Th and 35 wt % U (enriched to 16%), and
  (2) 0.6 wt % Europium (Eu) burnable poison; and
iii) twelve outer fuel pins 200c comprising:
  (1) fuel pellets 300b with a fuel composition comprising 80 wt % Th and 20 wt % U (enriched 15%), and
  (2) no burnable poison.

According to various non-limiting embodiments, the same type of fuel bundles (e.g., as described immediately above) may be used at all locations within the reactor in place of the above-discussed bundles 100a, 100b, and 100c, which had divergent compositions.

CANDU 600 MWe Reactor Embodiments

Figure 6:
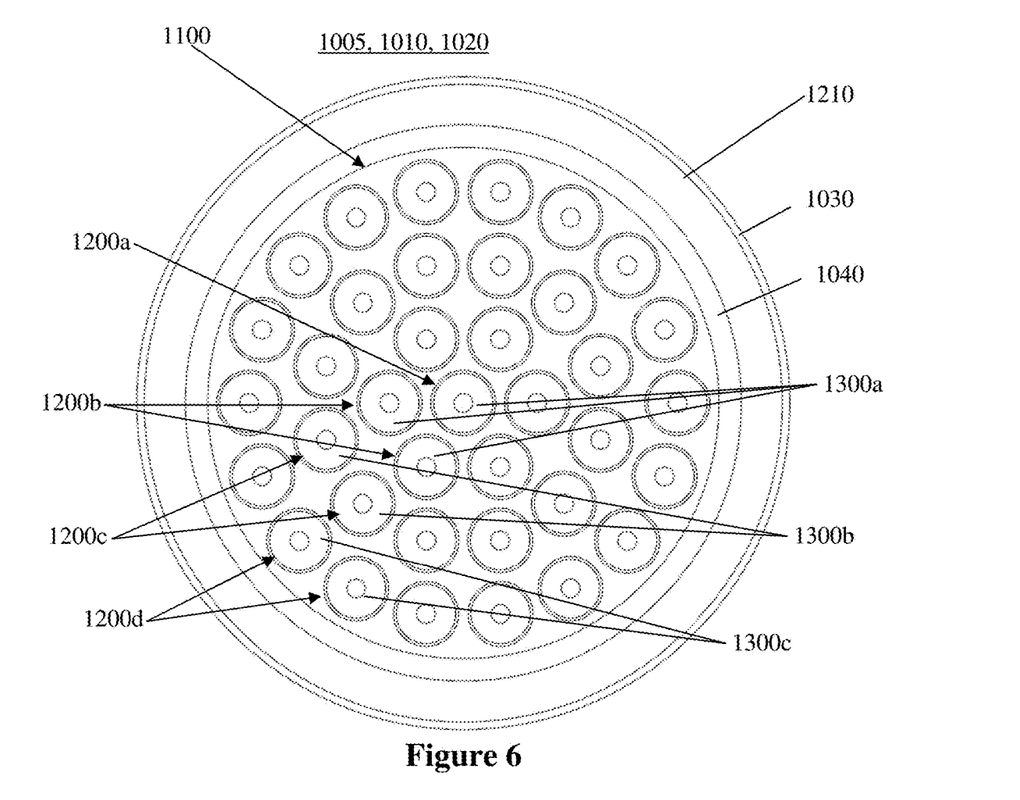
FIG. 6 is a diagrammatic end view of a fuel bundle and a portion of a reactor according to one or more non-limiting alternative embodiments of a CANDU reactor.

FIG. 6 illustrates a reactor 1005 according to one or more non-limiting alternative embodiments. The illustrated reactor 1005 is generally similar to the above-discussed embodiments, so a redundant explanation of similar or identical structures and features is omitted. As shown in FIG. 6, the reactor 1005 houses a core 1020 that comprises a plurality of calandria tubes 1030 and pressure tubes 1040 that define the channels into which fuel bundles 1100 are placed.

In the illustrated embodiment, the reactor 1005, reactor vessel/housing 1010, calandria tubes 1030, and pressure tubes 1040 are well-known components of a CANDU type reactor to which one or more non-limiting embodiments are directed, so an exhaustive description of these conventional components of a CANDU reactor are omitted. Similarly, the dimensions and configurations of the fuel bundles 1100 and pins 1200a, 1200b, 1200c, 1200d are likewise well-known in connection with the CANDU reactor to which various non-limiting embodiments are directed, so an exhaustive description of such dimensions and configurations is omitted.

As shown in FIG. 6, each fuel bundle 1100 comprises 37 fuel pins, including: one central fuel pin 1200a containing fuel pellets 1300a, six first ring fuel pins 1200b containing fuel pellets 1300a, twelve second ring fuel pins 1200c containing fuel pellets 1300b, and eighteen outer ring fuel pins 1200d containing fuel pellets 1300c.

Figure 7:
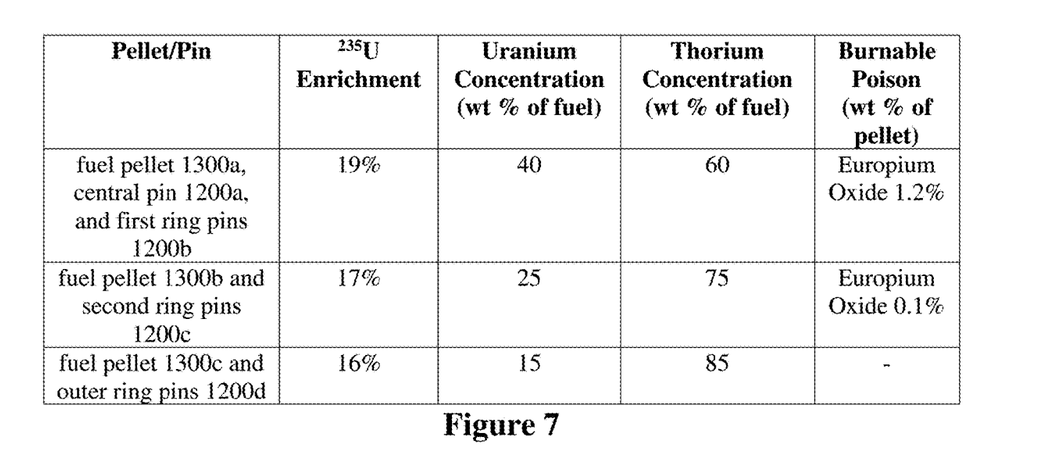
FIG. 7 is a table showing the composition of the pellets, pins, and fuel bundles, according to one or more non-limiting embodiments of the reactor illustrated in FIG. 6.

As shown in the non-limiting embodiment illustrated in FIG. 7, the composition of the fuel pellets 1300a, 1300b, 1300c of the fuel pins 1200a, 1200b, 1200c, 1200d of the fuel bundles 1100 according to one or more embodiments differ from those of a conventional 37-pin CANDU fuel bundle.

According to one or more embodiments of the fuel bundles 1100 and/or fuel pins 1200a, 1200b, 1200c, and/or 1200d, the fuel pellets 1300a, 1300b, and/or 1300c utilize uranium enriched to (a) at least 13, 14, 15, 16, 17, and/or 18% $^{235}$U enrichment, (b) less than or equal to 19.95, 19, 18, and/or 17% $^{235}$U enrichment, and/or (c) between any two such upper and lower values (e.g., between 13 and 19.95% $^{235}$U enrichment, between 16 and 19% $^{235}$U enrichment, about 16, 17, 18, or 19% $^{235}$U enrichment).

According to various non-limiting embodiments, the $^{235}$U enrichment of the fuel pellets 1300a in the central fuel pin 1200a and/or first ring fuel pins 1200b are equal to each other. However, according to one or more alternative embodiments, the enrichment level of the fuel pellets in the central pin 1200a may be higher or lower than the enrichment of the fuel pellets in the first ring fuel pins 1200b.

According to various non-limiting embodiments, the $^{235}$U enrichment of the fuel pellets 1300a in the central fuel pin 1200a and/or first ring fuel pins 1200b is higher than the 235 U enrichment of the fuel pellets 1300b in the second ring pins 1200c and/or the fuel pellets 1300c in the outer ring pins 1200d by (a) at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.5, 5.0, 5.5, 6.0, 6.5, 7.0, 7.5, and/or 8.0 absolute %, (b) less than or equal to 8.0, 7.5, 7.0, 6.5, 6.0, 5.5, 5.0, 4.5, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.5, 0.4, 0.3, and/or 0.2 absolute %, and/or (c) any value between such upper and lower limits (e.g., between 0.1 and 8.0 absolute %, between 0.5 and 1.5 absolute %, between 1.5 and 2.5 absolute %, about 1 absolute %, about 3 absolute %). As used herein, 'absolute %" of enrichment means percentage of enrichment, not a percentage deviation from another enrichment value. As a result, a fuel pellet 1300a with a 19% enrichment has 2 absolute % higher enrichment than a pellet 1300b with a 17% enrichment.

According to various non-limiting embodiments, the $^{235}$U enrichment of the fuel pellets 1300b in the second ring pins 1200c is higher than the $^{235}$U enrichment of the fuel pellets 1300c in the outer ring pins 1200d by (a) at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.5, 5.0, 5.5, 6.0, 6.5, and/or 7.0 absolute %, (b) less than or equal to 7.0, 6.5, 6.0, 5.5, 5.0, 4.5, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3 and/or 0.2 absolute %, and/or (c) any value between such upper and lower limits (e.g., between 0.1 and 7.0 absolute %, between 0.5 and 1.5 absolute %, about 1 absolute %).

According to one or more non-limiting embodiments, the fuel pellets 1300a and/or 1300b and/or the pins 1200a, 1200b, and/or 1200c include burnable poison. According to various embodiments, the burnable poison used in the pellets 1300a and/or 1300b and/or pins 1200a, 1200b, and/or 1200c comprises Europium Oxide at a concentration of (a) at least 0.05, 0.06, 0.07, 0.08, 0.09, 0.1, 0.11, 0.12, 0.13, 0.14, 0.15, 0.16, 0.17, 0.18, 0.19, 0.2, 0.3, 0.4, 0.5, 0.6, 0.7, 0.8, 0.9, 1.0, 1.1, 1.2, and/or 1.3 wt % of the pellet, (b) less than or equal to 3.0, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.15, 0.14, 0.13, 0.12, 0.11, 0.1, 0.09, 0.08, 0.07, 0.06, and/or 0.05 wt % of the pellet, and/or (c) between any two such values (e.g., between 0.05 and 3.0 wt % of the pellet, between 1.0 and 2.0% of the pellet, about 1.2 wt % of the pellet, between 0.05 wt % and 0.2 wt %, between 0.05 and 0.15 wt %). According to various embodiments, a burnable poison concentration in the fuel pellets 1300a and/or central and first pins 1200a, 1200b is higher than the burnable poison (e.g., Europium Oxide) concentration in the fuel pellets 1300b and/or second ring pins 1200c by (a) at least 0.1, 0.2, 0.3, 0.4, 0.5, 0.6, 0.7, 0.8, 0.9, 1.0, and/or 1.0 absolute wt %, (b) less than 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, and/or 0.1 absolute wt %, and/or (c) between any two such values (e.g., between 0.1 and 2.0 absolute wt %, between 0.5 and 1.7 absolute wt %, about 1.1 absolute wt %). According to one or more non-limiting embodiments, the fuel pellets 1300a have a Europium Oxide concentration of 1.2 wt %, and the fuel pellets 1300b have a Europium Oxide concentration of 0.1 wt % such that the pellets 1300a have a 1.1 absolute wt % higher Europium Oxide concentration than the pellets 1300b. According to one or more alternative embodiments, any other burnable poison (e.g., Erbium Oxide) may additionally and/or alternatively be used.

According to various alternative embodiments, burnable poison (e.g., Europium Oxide and/or Erbium Oxide in the concentrations discussed in any of the above embodiments) may additionally and/or alternatively be provided in the fuel pellets 1300c and/or pins 1200d.

According to one or more embodiments, the thorium fuel concentration (i.e., a wt % thorium as a portion of the overall fuel weight) in the fuel pellets 1300a of the central pin 1200a and/or first ring pins 1200b that is (a) at least 45, 50, 55, 57.5, 60, 62.5, and/or 65 wt %, (b) less than or equal to 90, 85, 80, 75, 70, 65, 62.5, and/or 60 wt %, and/or (c) between any two such values (e.g., between 45 and 90 wt %, between 50 and 70 wt %, between 55 and 65 wt %, between 57.5 and 62.5 wt %, about 65 wt %). According to various non-limiting embodiments, a balance of the pellet's fuel composition is uranium (e.g., 65 wt % thorium and 35 wt % uranium).

According to one or more embodiments, the thorium fuel concentration (i.e., a wt % thorium as a portion of the overall fuel weight) in the fuel pellets 1300b of the second ring pins 1200c is (a) at least 55, 60, 65, 70, 72.5, 75, and/or 77.5 wt %, (b) less than or equal to 95, 85, 80, 77.5, 75, and/or 72.5 wt %, and/or (c) between any two such values (e.g., between 55 and 95 wt %, between 65 and 85 wt %, between 70 and 80 wt %, between 72.5 and 77.5 wt %, about 75 wt %). According to various non-limiting embodiments, a balance of the pellet's fuel composition is uranium (e.g., 75 wt % thorium and 25 wt % uranium).

According to one or more embodiments, the thorium fuel concentration (i.e., a wt % thorium as a portion of the overall fuel weight) in the fuel pellets 1300c of the outer ring pins 1200d is (a) at least 55, 60, 65, 70, 75, 80, 82.5, 85, and/or 87.5 wt %, (b) less than or equal to 99, 95, 90, 87.5 85, and/or 82.5 wt %, and/or (c) between any two such values (e.g., between 55 and 99 wt %, between 75 and 95 wt %, between 80 and 90 wt %, between 82.5 and 87.5 wt %, about 85 wt %). According to various non-limiting embodiments, a balance of the pellet's fuel composition is uranium (e.g., 85 wt % thorium and 15 wt % uranium).

According to one or more of these embodiments, the thorium fuel concentration in the pellets 1300c of the outer ring pins 1200d is higher than the thorium fuel concentration in the fuel pellets 1300b and/or 1300c of the second ring pins 1200c, the first ring pins 1200b, and/or the central pin 1200a. According to various non-limiting examples, the thorium fuel concentration (i.e., a wt % thorium as a portion of the overall fuel weight) in the pellets 1300c is higher than the thorium fuel concentration in the pellets 1300b by (a) at least 1, 2, 3, 4, 5, 6, 7, 8, 9, 10, 11, 12, 13, 14, and/or 15 absolute wt %, (b) less than 25, 20, 19, 18, 17, 16, 15, 14, 13, 12, 11, 10, 9, 8, 7, 6, 5, 4, 3, 2, and/or 1 absolute wt %, and/or (c) a value between any two such values (e.g., between 1 and 25 absolute wt %, between 5 and 15 wt %, about 10 wt %). According to various non-limiting examples, the thorium fuel concentration in the pellets 1300c is higher than the thorium fuel concentration in the pellets 1300a by (a) at least 1, 2, 3, 4, 5, 6, 7, 8, 9, 10, 11, 12, 13, 14, 15, 16, 17, 18, 19, 20, 21, 22, 23, 24, 25, 26, 27, 28, 29, and/or 30 absolute wt %, (b) less than 30, 29, 28, 27, 26, 25, 24, 23, 22, 21, 20, 19, 18, 17, 16, 15, 14, 13, 12, 11, 10, 9, 8, 7, 6, 5, 4, 3, 2, and/or 1 absolute wt %, and/or (c) a value between any two such values (e.g., between 1 and 30 absolute wt %, between 20 and 30 wt %, about 25 wt %).

According to one or more embodiments, the thorium fuel concentration in the pellets 1300b of the second ring pins 1200c is higher than the thorium fuel concentration in the fuel pellets 1300a of the first ring pins 1200b and/or central pin 1200a. According to various non-limiting examples, the thorium fuel concentration in the pellets 1300b is higher than the thorium fuel concentration in the pellets 1300a by (a) at least 1, 2, 3, 4, 5, 6, 7, 8, 9, 10, 11, 12, 13, 14, 15, 16, 17, 18, 19, and/or 20 absolute wt %, (b) less than 30, 25, 20, 19, 18, 17, 16, 15, 14, 13, 12, 11, 10, 9, 8, 7, 6, 5, 4, 3, 2, and/or 1 absolute wt %, and/or (c) a value between any two such values (e.g., between 1 and 30 absolute wt %, between 5 and 25 absolute wt %, between 10 and 20 absolute wt %, and/or about 15 absolute wt %).

As used herein, 'absolute wt %" means percentage of the overall fuel content, not a percentage deviation from another value. As a result, a fuel pellet 1300a with a 60 wt % thorium fuel concentration has 15 absolute wt % less concentration than a fuel pellet 1300b with a 75 wt % thorium fuel concentration.

According to various non-limiting embodiments, the composition (e.g., $^{235}$U enrichment level, thorium/uranium concentration, poison concentration) of all fuel pellets 1300a in the central pin 1200a and/or the first ring pins 1200b may be the same. According to various non-limiting embodiments, the composition of all fuel pellets 1300b in the second ring pins 1200c may be the same. According to various non-limiting embodiments, the composition of all fuel pellets 1300c in the outer ring pins 1200d may be the same. According to various alternative embodiments, different pins within a given ring may utilize pellets with different compositions. According to various alternative embodiments, the fuel pellets within a given pin may have different compositions than each other.

According to various non-limiting embodiments, the fuel is utilized in an open fuel cycle where thorium is converted to U233 which is burned in-situ. According to various non-limiting embodiments, the fuel is burned to levels that are not achievable with current CANDU/PHWR fuels. According to various non-limiting embodiments, residual amounts of fissile material is not significant for use in non power reactor applications. The fuel is characterized by inherent safety features such as strongly negative fuel temperature reactivity coefficient and reduced coolant void reactivity.

Alternative Reactors

The above described embodiments involve fuel 100, 200, 300 for a 220 MWe PHWR or fuel 1100, 1200, 1300 for a CANDU 600 MWe reactor. However, various embodiments can be used on other types of PHWRs without deviating from the scope of the invention. For example, various of the above-described embodiments can be applied to other Indian PHWRs (e.g., Indian 540 MWe PHWR, Indian 700 MWe PHWR) or other CANDU reactors (e.g., 300 or 900 MWe), and may use fuel bundles with greater or fewer pins than the 19-pin and 37-pin embodiments in the above-described embodiments.

Unless otherwise explicitly stated, the compositions (e.g., in terms of wt %, fuel, burnable poison, etc.) herein for pellets, pins, and fuel bundles refer to the composition for a fresh, non-irradiated pellet, pin, or fuel bundle before being used in the reactor, rather than the composition after irradiation within the reactor. A fresh pellet may comprise recycled uranium, depleted uranium, natural uranium, and/or uranium from any other source, including sources of previously irradiated uranium. Similarly, a fresh pellet may comprise thorium from any source, including sources that have been previously irradiated.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A fuel bundle configured to be used in a PHWR, the fuel bundle comprising:
    a plurality of fuel pins, each of said plurality of fuel pins comprising:
        a sealed tube, and
        a plurality of fuel pellets disposed inside the sealed tube, the plurality of fuel pellets each comprising thorium and uranium fuel,
    wherein a fuel composition of each of the fuel pellets is between 55 and 90 wt % thorium,
    wherein the fuel composition of each of the fuel pellets is between 10 and 45 wt % uranium,
    wherein $^{235}$U enrichment of the uranium is between 10.5% and 20%,
    wherein the fuel composition of at least one of the plurality of fuel pins differs from the fuel composition in at least one other of the plurality of fuel pins,
    wherein the fuel bundle is shaped and configured to be used in a PHWR,
    wherein the plurality of fuel pins comprise:
        an inner fuel pin comprising a central fuel pin,
        a first ring of fuel pins disposed radially outwardly from the inner fuel pin, and
        a second ring of fuel pins disposed radially outwardly from the first ring of fuel pins, and
    wherein a thorium weight percentage of the fuel composition of the inner fuel pin is lower than a thorium weight percentage of the fuel composition of each of the second ring fuel pins.

2. The fuel bundle of claim 1, wherein:
    the fuel composition of each of the inner fuel pin and first ring fuel pins has a thorium content of between 55 and 75 wt %;
    the fuel composition of each of the second ring fuel pins has a thorium content of between 65 and 90 wt %; and
    each of the second ring fuel pins has a higher wt % thorium content than each of the inner fuel pin and first ring fuel pins.

3. The fuel bundle of claim 1, wherein the plurality of fuel pins has exactly 19 fuel pins comprising one inner fuel pin, six first ring of fuel pins, and twelve second ring fuel pins.

4. The fuel bundle of claim 1, further comprising burnable poison disposed in the sealed tube of each of the first ring fuel pins.

5. The fuel bundle of claim 4, wherein burnable poison is not disposed in the sealed tube of any of the second ring fuel pins.

6. The fuel bundle of claim 1, further comprising burnable poison disposed in the sealed tube of each of the inner fuel pin and first ring fuel pins, wherein burnable poison is not disposed in the sealed tube of any of the second ring fuel pins.

7. The fuel bundle of claim 6, wherein the burnable poison disposed in the sealed tube of each of the inner and first ring fuel pins comprises Europium.

8. The fuel bundle of claim 1, further comprising burnable poison disposed in the sealed tube of each of the second ring fuel pins.

9. The fuel bundle of claim 8, wherein burnable poison is not disposed in the sealed tube of the inner fuel pin or any of the first ring fuel pins.

10. The fuel bundle of claim 1, wherein burnable poison is not disposed in the sealed tube of any of the fuel pins of the fuel bundle.

11. The fuel bundle of claim 1, wherein a $^{235}$U enrichment of the uranium of each of the inner fuel pin, first ring fuel pins, and second ring fuel pins is at least 12%.

12. The fuel bundle of claim 1, wherein a $^{235}$U enrichment of the uranium of each of pellets of each of the inner fuel pin, first ring fuel pins, and second ring fuel pins is at least 15%.

13. The fuel bundle of claim 12, wherein a $^{235}$U enrichment of the uranium of each of the pellets of each of the second ring pins is lower than a $^{235}$U enrichment of the uranium of each of the pellets of each of the inner and first ring pins.

14. The fuel bundle of claim 1, wherein the first ring of fuel pins is an innermost ring of fuel pins in the fuel bundle.

15. The fuel bundle of claim 1, wherein the first ring of fuel pins is adjacent to the inner fuel pin.

16. A PHWR comprising:
a reactor vessel; and
a core disposed in the reactor vessel, the core comprising a plurality of fuel bundles according to claim 1,
wherein the plurality of fuel bundles comprise at least one first fuel bundle and at least one second fuel bundle,
wherein the at least one first fuel bundle comprises burnable poison, and
wherein the at least one second fuel bundle does not comprise burnable poison.

17. The pressurized heavy water reactor of claim 16, wherein the at least one first and at least one second fuel bundles are identical to each other except for the inclusion of burnable poison in the at least one second fuel bundle.

18. A fuel bundle configured to be used in a PHWR, the fuel bundle comprising:
a plurality of fuel pins, each of said plurality of fuel pins comprising:
a sealed tube, and
a plurality of fuel pellets disposed inside the sealed tube, the plurality of fuel pellets each comprising thorium and uranium fuel,
wherein a fuel composition of each of the fuel pellets is between 55 and 90 wt % thorium,
wherein the fuel composition of each of the fuel pellets is between 10 and 45 wt % uranium,
wherein $^{235}$U enrichment of the uranium is between 10.5% and 20%,
wherein the fuel composition of at least one of the plurality of fuel pins differs from the fuel composition in at least one other of the plurality of fuel pins,
wherein the fuel bundle is shaped and configured to be used in a PHWR,
wherein the plurality of fuel pins comprise:
an inner fuel pin,
a first ring of fuel pins disposed radially outwardly from the inner fuel pin, and
a second ring of fuel pins disposed radially outwardly from the first ring of fuel pins,
wherein a thorium weight percentage of the fuel composition of the inner fuel pin is lower than a thorium weight percentage of the fuel composition of each of the second ring fuel pins,
wherein the fuel composition of the inner fuel pin has a lower wt % thorium content than in each of the first ring fuel pins, and
wherein the fuel composition of each of the first ring fuel pins has a lower wt % thorium content than in each of the second ring fuel pins.

19. The fuel bundle of claim 18, wherein:
the fuel composition of the inner fuel pin has a thorium content of between 55 and 70 wt %;
the fuel composition of each of the first ring fuel pins has a thorium content of between 60 and 80 wt %; and
the fuel composition of each of the second ring fuel pins has a thorium content of between 65 and 90 wt %.

20. The fuel bundle of claim 19, wherein:
the fuel composition of the inner fuel pin has a thorium content of between 55 and 65 wt %;
the fuel composition of each of the first ring fuel pins has a thorium content of between 60 and 70 wt %; and
the fuel composition of each of the second ring fuel pins has a thorium content of between 75 and 85 wt %.

21. The fuel bundle of claim 20, further comprising burnable poison disposed in the sealed tube of each of the inner fuel pin and first ring fuel pins, wherein burnable poison is not disposed in the sealed tube of any of the second ring fuel pins.

22. The fuel bundle of claim 21, wherein a $^{235}$U enrichment of the uranium of each of the pellets of each of the second ring pins is lower than a $^{235}$U enrichment of the uranium of each of the pellets of each of the inner and first ring pins.

23. A fuel bundle configured to be used in a PHWR, the fuel bundle comprising:
a plurality of fuel pins, each of said plurality of fuel pins comprising:
a sealed tube, and
a plurality of fuel pellets disposed inside the sealed tube, the plurality of fuel pellets each comprising thorium and uranium fuel,
wherein a fuel composition of each of the fuel pellets is between 55 and 90 wt % thorium,
wherein the fuel composition of each of the fuel pellets is between 10 and 45 wt % uranium,
wherein $^{235}$U enrichment of the uranium is between 10.5% and 20%,
wherein the fuel composition of at least one of the plurality of fuel pins differs from the fuel composition in at least one other of the plurality of fuel pins,
wherein the fuel bundle is shaped and configured to be used in a PHWR,
wherein the plurality of fuel pins comprise:
an inner fuel pin comprising a central fuel pin,
a first ring of fuel pins disposed radially outwardly from the inner fuel pin, and
a second ring of fuel pins disposed radially outwardly from the first ring of fuel pins,
wherein a thorium weight percentage of the fuel composition of the inner fuel pin is lower than a thorium weight percentage of the fuel composition of each of the second ring fuel pins,
wherein the fuel composition of the inner fuel pin has an equal or lower wt % thorium content than in each of the first ring fuel pins, and
wherein the fuel composition of each of the first ring fuel pins has a lower wt % thorium content than in each of the second ring fuel pins.

* * * * *